United States Patent Office 2,773,797
Patented Dec. 11, 1956

2,773,797

METHOD OF INCREASING THE COLLOIDAL SULFUR CONTENT OF BENTONITE-SULFUR MIXTURE

Edward F. Orwoll, Medina, N. Y., assignor to Food Machinery and Chemical Corporation, San Jose, Calif.

No Drawing. Application October 10, 1951,
Serial No. 250,795

2 Claims. (Cl. 167—20)

The present invention relates to an improvement in the manufacture of collodial sulfur-bearing insecticidal and fungicidal type generally known in the trade as fused bentonite sulfur.

So-called fused bentonite sulfur has been prepared for many years in accordance with the procedures outlined in Banks Patent No. 1,550,650 granted August 18, 1925. In that operation, bentonite and sulfur are heated together at a fusion temperature within the range of about 125° C. to 140° C. until some type of sintering occurs and the individual particles of yellow sulfur can no longer be identified in the mass.

Although Banks recommends about equal weights of bentonite and sulfur, the trade has demanded a product in which the bentonite and sulfur are in the relative proportions of about 2 to 1. This product serves an excellent purpose as a fungicide, and little has been done in the way of improving its manufacture until the suggestion of Les Veaux in an application filed in the United States Patent Office May 16, 1950, under Serial No. 162,390, now U. S. Patent No. 2,664,379.

In that operation there described, the fused bentonite sulfur was subjected to humid conditions and then refused, the result being a substantial increase in the content of what is believed to be the active ingredient of the mix; that is, colloidal sulfur.

It is an object of the present invention to prepare colloidal sulfur-bearing products of the fused bentonite sulfur type possessing a colloidal sulfur content considerably in excess of the colloidal sulfur content of the usual fused bentonite sulfur as exempliified in the product described in the Banks patent referred to hereinabove.

In accordance with the broad concepts of the present invention, bentonite and sulfur are fused together in proportions in the range of 1 to 1 to 4 to 1 and preferably in proportions of approximately 2 to 1.

In accordance with the broad principles of the invention, the bentonite sulfur composition is treated with sufficient liquid water to swell the bentonite and form a heavy paste and, in general, the amount of water based upon the bentonite should be within the range of approximately 20% to 75%. This figure will depend upon the origin and type of bentonite and is readily apparent to those familiar with the properties of this material, keeping in mind that the addition of water is for the purpose of swelling the bentonite to prepare a partially doughy mass rather than a pourable slurry.

The doughy paste is thereafter kneaded while in the paste condition, whereby the elemental sulfur is apparently changed by the grinding, slipping and shearing action produced in the mix by kneading, to a colloidal form by reason of the fact that the colloidal sulfur content of the originally fused bentonite is increased from 40 to 100% or more. The resultant product possessed not only an increased colloidal sulfur content, as determined by the method recommended in the Niagara Analytical Abstracts published by Niagara Chemical Division, Food Machinery & Chemical Corporation, Middleport, New York, 5th edition, page 45, but an actual increase in fungicidal activity as determined by biologic assay.

The chemical method of assay, briefly, is to grind a one gram sample of the product (the colloidal sulfur content of which is to be determined), suspend the same in a 500 cc. graduate filled with water, and permit the contents to settle for 16 hours, whereupon 400 cc. of the milky suspension is siphoned off, oxidized with sodium peroxide and the sulfur determined by precipitation of the sulfate.

As an actual example, the following are given merely as illustrations of the principles of the invention and are not deemed to be limitative.

Example I

A sample of fused bentonite sulfur was prepared by fusing 2 parts of ground bentonite with 1 part ground sulfur at a temperature of 140° C., substantially as described in Banks Patent No. 1,550,660. A portion of this product (sample A) was analyzed for colloidal sulfur by the method above described, and the colloidal sulfur content found to be 11.9%. To another portion of this fused bentonite sulfur there was added sufficient water to prepare a heavy paste therefrom. This paste contained 21% water when analyzed for moisture. The product was kneaded in a dough mixer of the Baker-Perkins type and the whole charge kneaded in this manner for 1½ hours, at which time the product was removed from the machine and dried wtihout fusion; that is, at temperatures below about 112° C., care being taken not to fuse the sulfur in the product.

The amount of colloidal sulfur in this latter product (sample B), as determined chemically, was 18.2% as contrasted with the original content of 11.9% in sample A.

To determine the relative shelf stability of the two products, sulfur contents were determined after storage in sealed containers for nine months. The colloidal sulfur content in the original fused bentonite sulfur (sample A) had dropped 25% in contrast to the colloidal sulfur content in the product which had been pasted and kneaded (sample B), which dropped only 11%; that is to say, the drop in colloidal sulfur content in the original mix was more than twice the drop percentage-wise of the colloidal sulfur content of the improved product of the present invention.

By means of the paste grinding of the present invention, it is possible to prepare fused bentonite sulfur compositions of relatively high colloidal sulfur content and biologic activity without the necessity of a second fusion and to thereby produce products of a relatively high colloidal sulfur content.

It is believed that the action of water on bentonite tends to spread the adjacent lamina of bentonite and thereby permit entry of sulfur particles of colloidal size between adjacent lamina and to be retained therein. On this theory, it should be possible to prepare a bentonite sulfur of high colloidal sulfur content by the mere grinding of bentonite and sulfur provided a grinding procedure be available which produces sulfur of colloidal size. Such a grinding was undertaken by grinding sulfur and bentonite while the latter was in paste form and a product was produced of good colloidal sulfur content.

Example II 333 parts by weight of ground bentonite was blended with 168 parts by weight of ground sulfur and to the mixture was added 100 parts by weight of distilled water, whereby a thick paste or dough was produced due to the swelling of the bentonite in the mix. This product was kneaded in the same fashion as the mix in Example I and kneading was continued for 2½ hours. The product was then dried in an oven at about 100° C. and subsequently analyzed chemically for colloidal sulfur. The mix contained 7.3% colloidal sulfur.

A portion of the dry blend of bentonite and sulfur as first obtained and prior to the addition of water and subsequent kneading, was similarly analyzed for colloidal sulfur and found to contain 0.6% colloidal sulfur. The product which had been kneaded with water was analyzed after standing in a container for 3 months and the colloidal sulfur content determined as 6.7%; that is, a drop of 8.2% in the colloidal sulfur content had occurred in the interval.

In order to determine whether or not the colloidal sulfur present in the bentonite sulfur made by kneading the wet mix, possessed fungicidal activity, comparable to the colloidal sulfur in fused bentonite sulfur, a standard commercial sample of fused bentonite sulfur was obtained on the market which possessed a colloidal sulfur content of 6.6%. The biologic activity of this sample was determined and compared with the biologic activity of the bentonite sulfur product prepared in accordance with Example II which, after aging, possessed a colloidal sulfur content of 6.7%.

The biologic assay consisted in preparing a standard suspension of the two bentonite sulfur samples and spraying these at standard application rates upon young bean plants. These plants were then subsequently dusted with spores of bean rust (uromyces appendiculatus). This assay was made to determine the concentration required to give a 50% control as determined against a blank not treated with fungicide. In each instance, the $LD_{50}$ was 120 parts per million, indicating that the biologic activity of the sample of bentonite sulfur mix prepared by kneading was the same as the biologic activity of the commercial sample of fused bentonite sulfur.

While it is not definitely known what the mechanism is which permits the production of colloidal sulfur by kneading the mix of bentonite and sulfur, whether fused or unfused, provided the mix be in paste form, it is believed that the constant shearing action in the kneaded paste or dough is sufficiently intense to disintegrated the macroscopic or gross particles of sulfur to particles of colloidal size and dimensions. In any event, whatever the mechanism may be, it is possible to produce, by grinding in paste form in the presence of bentonite, compositions of bentonite and sulfur to produce end products containing physiologically active sulfur, i. e., sulfur in colloidal form and to increase the colloidal sulfur content of the ordinary fused bentonite sulfur by such a procedure.

What is claimed is:

1. The method of increasing the colloidal sulfur content of a fused bentonite sulfur mixture which comprises fusing bentonite clay and non-colloidal elemental sulfur in the proportions by weight of one part bentonite clay to one part sulfur to four parts bentonite clay to one part sulfur, by heating the bentonite clay and sulfur in the range about 125° C. to 140° C. until some of the sulfur is changed to colloidal sulfur, adding water to the fused product in an amount to produce a moisture content therein of 20% to 75% based on the dry weight of the mixture in order to produce a doughy paste therewith, kneading the doughy paste until additional noncolloidal sulfur has been changed to colloidal sulfur and the total amount of colloidal sulfur in the mass has been increased thereby, and thereafter drying the paste at a temperature below the fusing point of sulfur.

2. The steps in the method of preparing bentonite clay containing colloidal sulfur which comprise adding to a mixture of bentonite clay and noncolloidal elemental sulfur, in the range one part bentonite clay to one part noncolloidal elemental sulfur to four parts bentonite clay to one part noncolloidal elemental sulfur by weight, an amount of water sufficient to produce a moisture content in the mixture of 20% to 75% based upon the dry weight of the mixture in order to produce a doughy paste therewith, kneading the doughy paste until some of the noncolloidal sulfur is changed to colloidal sulfur and the amount of the collaidal sulfur in the mixture has been increased, and thereafter drying the paste at a temperature below the fusing point of sulfur.

References Cited in the file of this patent
UNITED STATES PATENTS

| | | |
|---|---|---|
| 1,550,650 | Banks | Aug. 18, 1925 |
| 1,662,550 | Vreeland | Mar. 13, 1928 |
| 1,934,989 | McDaniel | Nov. 14, 1933 |
| 2,664,379 | Russo et al. | Dec. 29, 1953 |

FOREIGN PATENTS

| | | |
|---|---|---|
| 601,666 | Great Britain | May 11, 1948 |